United States Patent
Urrutia Daglio et al.

(10) Patent No.: US 11,233,895 B2
(45) Date of Patent: Jan. 25, 2022

(54) AUTOMATIC WALLPAPER SETTING METHOD, TERMINAL DEVICE, AND GRAPHICAL USER INTERFACE

(71) Applicant: Huawei Technologies Co., Ltd., Shenzhen (CN)

(72) Inventors: Alejandro Urrutia Daglio, Shenzhen (CN); Yi Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 235 days.

(21) Appl. No.: 16/474,806

(22) PCT Filed: Dec. 30, 2016

(86) PCT No.: PCT/CN2016/113841
§ 371 (c)(1),
(2) Date: Jun. 28, 2019

(87) PCT Pub. No.: WO2018/120169
PCT Pub. Date: Jul. 5, 2018

(65) Prior Publication Data
US 2019/0342444 A1 Nov. 7, 2019

(51) Int. Cl.
H04M 1/72427 (2021.01)
G06F 9/451 (2018.01)
H04M 1/72472 (2021.01)

(52) U.S. Cl.
CPC ........ *H04M 1/72427* (2021.01); *G06F 9/451* (2018.02); *H04M 1/72472* (2021.01)

(58) Field of Classification Search
CPC ......... H04M 1/72427; H04M 1/72472; G06F 9/451; G06F 3/04817
See application file for complete search history.

(56) References Cited

U.S. PATENT DOCUMENTS 8,271,333 B1 9/2012 Grigsby et al.
9,030,716 B2 5/2015 Kim
(Continued)

FOREIGN PATENT DOCUMENTS

CN 103049258 A 4/2013
CN 103165152 A 6/2013
(Continued)

OTHER PUBLICATIONS

Machine Translation and Abstract of Chinese Publication No. CN103500122, Jan. 8, 2014, 24 pages.
(Continued)

*Primary Examiner* — Brandon J Miller
(74) *Attorney, Agent, or Firm* — Conley Rose, P.C.

(57) ABSTRACT

The present invention discloses an automatic wallpaper setting method, a terminal device, and a graphical user interface. The method includes: obtaining, by a terminal device when a multimedia file of at least one preset widget changes, one or more first posters corresponding to a current multimedia file, where the at least one widget is displayed on a screen of the terminal device; setting at least one of the obtained one or more first posters as wallpaper of a current screen; and displaying the specified wallpaper. Content of a desktop widget can be extended, and more information can be provided for a user without increasing a user operation, thereby improving user experience.

20 Claims, 4 Drawing Sheets

(56) References Cited

U.S. PATENT DOCUMENTS

| | | | |
|---|---|---|---|
| 2009/0007017 A1* | 1/2009 | Anzures | H04M 1/72469 |
| | | | 715/835 |
| 2009/0061837 A1 | 3/2009 | Chaudhri et al. | |
| 2013/0058019 A1* | 3/2013 | Lee | G06F 3/04883 |
| | | | 361/679.01 |
| 2013/0061172 A1* | 3/2013 | Huang | G06F 3/04817 |
| | | | 715/808 |
| 2013/0069962 A1* | 3/2013 | Nealer | H04M 1/72427 |
| | | | 345/522 |

FOREIGN PATENT DOCUMENTS

| | | | |
|---|---|---|---|
| CN | 103500122 A | 1/2014 | |
| CN | 103500234 A | 1/2014 | |
| CN | 103530410 A | 1/2014 | |
| CN | 103677586 A | 3/2014 | |
| CN | 103699323 A | 4/2014 | |
| CN | 103995649 A | 8/2014 | |
| CN | 105992029 A | 10/2016 | |
| KR | 20100129903 A | 12/2010 | |

OTHER PUBLICATIONS

Machine Translation and Abstract of Chinese Publication No. CN103500234, Jan. 8, 2014, 27 pages.
Machine Translation and Abstract of Chinese Publication No. CN103530410, Jan. 22, 2014, 25 pages.
Machine Translation and Abstract of Chinese Publication No. CN103677586, Mar. 26, 2014, 10 pages.
Machine Translation and Abstract of Chinese Publication No. CN105992029, Oct. 5, 2016, 33 pages.
Machine Translation and Abstract of Chinese Publication No. CN103995649, Aug. 20, 2014, 15 pages.
Machine Translation and Abstract of Korean Publication No. KR20100129903, Dec. 10, 2010, 16 pages.
Foreign Communication From A Counterpart Application, PCT Application No. PCT/CN2016/113841, English Translation of International Search Report dated Sep. 29, 2017, 3 pages.
Foreign Communication From A Counterpart Application, PCT Application No. PCT/CN2016/113841, English Translation of Written Opinion dated Sep. 29, 2017, 4 pages.
Foreign Communication From A Counterpart Application, European Application No. 16925851.4, Extended European Search Report dated Dec. 4, 2019, 11 pages.
"How to set the singer picture in QQ music to the computer wallpaper?," retrieved from: https://www.jb51.net/softjc/416551.html, Jan. 4, 2016, 8 pages.
"How do I set the startup screen of a music box as the desktop wallpaper?," retrieved from: https://jingyan.baidu.com/article/75ab0bcbccbe21d6864db2b1.html, May 24, 2015, 7 pages.

* cited by examiner

AUTOMATIC WALLPAPER SETTING METHOD, TERMINAL DEVICE, AND GRAPHICAL USER INTERFACE

CROSS-REFERENCE TO RELATED APPLICATIONS

The present application is a national stage of International Application No. PCT/CN2016/113841, filed on Dec. 30, 2016, which is hereby incorporated by reference in its entirety.

TECHNICAL FIELD

Embodiments of the present invention relate to the communications field, and in particular, to an automatic wallpaper setting method, a terminal device, and a graphical user interface in the communications field.

BACKGROUND

In an intelligent operating system, such as Android, a desktop supports a widget function (namely, a desktop widget) that allows a direct operation on a function such as music. The desktop widget can both display information (such as a song name), and support related operations (such as playback, and switching to a previous one/a next one), and can also be used as an entry for enabling a function of an app.

An existing audio-video entertainment widget can support a simple operation, but cannot be extended in content, and as a result, extensibility is poor.

SUMMARY

Embodiments of the present invention provide an automatic wallpaper setting method and a device, to help extend content of a desktop widget, and provide more information for a user without increasing a user operation, thereby improving user experience.

According to a first aspect, an automatic wallpaper setting method is provided, including:

obtaining, by a terminal device when a multimedia file of at least one preset widget widget changes, at least one of one or more corresponding first posters in a current multimedia file, where the at least one widget is displayed on a screen of the terminal device;

setting at least one of the obtained one or more first posters as wallpaper of a current screen; and displaying the specified wallpaper.

In this way, when a multimedia file of a preset widget changes, a corresponding poster corresponding to a changed multimedia file may be automatically displayed as wallpaper. Therefore, more multimedia file information is provided in a timely manner, improving user experience.

In a first possible implementation of the first aspect, the obtaining, by a terminal device when a multimedia file of at least one preset widget widget changes, at least one of one or more corresponding first posters corresponding to a current multimedia file specifically includes: when the terminal device detects an operation performed on a previous or next key of the at least one preset widget, obtaining, by the terminal device, the at least one of one or more corresponding first posters in the current multimedia file.

In this way, when a preset widget receives a user instruction for playing a new multimedia file, wallpaper may be automatically updated while a current multimedia file is changed, so as to provide a user with a poster of the new multimedia file. Therefore, the user can obtain related information about the new multimedia file in a timely manner without an extra operation, improving user experience, and enhancing operation efficiency.

With reference to the foregoing possible implementation of the first aspect, in a second possible implementation of the first aspect, the method further includes:

when the terminal device displays an unlock screen, and it is determined that a user enables the at least one widget widget, determining whether the at least one widget has a multimedia file that has not been played completely;

if the at least one widget has one or more multimedia files that have not been played completely, obtaining one or more second posters corresponding to at least one multimedia file that has not been played completely;

setting at least one of the obtained one or more second posters as the wallpaper of the current screen; and displaying the specified wallpaper.

In this way, when the terminal device displays the unlock screen, if it is detected that a preset condition is met, that is, wallpaper may be set automatically, information about a multimedia file, of a current preset widget, that has not been played completely is prompted for the user, so that the user can remember, without opening a corresponding application, multimedia that is not watched or listened to completely last time. This is convenient for the user, decreases a user operation, and enhances intelligence of human-computer interaction.

With reference to the foregoing possible implementations of the first aspect, in a third possible implementation of the first aspect, the method further includes: when the terminal device is powered on or displays an unlock screen, determining a user preference based on historical playback data, collected by the terminal device, of the at least one preset widget widget;

obtaining one or more corresponding third posters based on the preference, and setting at least one of the obtained one or more third posters as the wallpaper of the current screen; and displaying the specified wallpaper.

Thus, when browsing a screen, a user can directly see related information about a multimedia file that is in accordance with a preference of the user or that may be of interest to the user, with no need to spend time on search. This is convenient for the user, and improves personalized experience.

With reference to the foregoing possible implementations of the first aspect, in a fourth possible implementation of the first aspect, the method further includes: obtaining one or more third posters pushed to the terminal device;

when the terminal device is powered on or displays an unlock screen, and it is determined that a user enables the at least one widget widget, setting at least one of the obtained one or more third posters as the wallpaper of the current screen; and displaying the specified wallpaper.

In this way, information pushed by a system can be displayed on a home screen that is display space larger than an application program status bar, and more details and a better visual effect can be provided for the user, improving user experience. In addition, a better effect of advertising can be provided for a content publisher, increasing market competitiveness of a device.

With reference to the foregoing possible implementations of the first aspect, in a fifth possible implementation of the first aspect, the method further includes: when the terminal device displays an unlock screen, first determining whether a user enables the at least one preset widget; and if it is determined that the user enables the at least one preset widget, determining whether the at least one widget has a multimedia file that has not been played completely, if the at least one widget has one or more multimedia files that have not been played completely, obtaining one or more second posters corresponding to at least one multimedia file that has not been played completely, setting at least one of the obtained one or more second posters as the wallpaper of the current screen, and displaying the specified wallpaper; or if it is determined that the user enables no preset widget, obtaining one or more posters corresponding to a user preference, setting at least one of the obtained one or more second posters as the wallpaper of the current screen, and displaying the specified wallpaper; or if it is determined that the user enables no preset widget, setting at least one of one or more pushed posters that are obtained, as the wallpaper of the current screen, and displaying the specified wallpaper.

In this way, when the terminal device displays the unlock screen, the terminal device can adaptively display, as wallpaper, a corresponding poster corresponding to current multimedia that has not been played completely; or when there is no current multimedia that has not been played completely, based on the user preference, the terminal device can automatically set a corresponding poster as wallpaper and display the wallpaper, or automatically set a pushed poster as wallpaper. Therefore, this can enrich displayed content on a desktop of the user, improving user experience.

According to a second aspect, a terminal device is provided. The terminal device includes: a display, a memory, and a processor. The display is configured to: display an operation interface corresponding to a function provided by the terminal device, where the operation interface displays at least one preset widget, and the widget has at least one shortcut operation function, for example, previous/next; and display specified wallpaper. The memory is configured to store a multimedia file and wallpaper. The processor is configured to: when a multimedia file of the at least one preset widget changes, obtain one or more first posters corresponding to a current multimedia file, and set at least one of the obtained one or more first posters as wallpaper.

The terminal device can adapt to a change in a multimedia file of a preset widget, and may provide a user with poster information related to a changed multimedia file without an action of the user. Therefore, more information is provided for the user without increasing a user operation, thereby improving user experience.

In a first possible implementation of the second aspect, the processor is specifically configured to: when an operation performed on a previous or next key of the at least one preset widget is detected, obtain one or more first posters corresponding to the current multimedia file, and set the at least one of the obtained one or more first posters as the wallpaper.

When a user performs an operation on a previous or next key of a preset widget, the terminal device automatically sets wallpaper to display a poster corresponding to a switched multimedia file. Therefore, more information is provided for the user without increasing a user operation, thereby improving user experience.

With reference to the foregoing possible implementation of the second aspect, in a second possible implementation of the second aspect, the processor is specifically further configured to: when the terminal device is powered on or displays an unlock screen, first determine whether a user enables the at least one preset widget; if it is determined that the at least one enabled preset widget exists, determine whether the at least one widget has a multimedia file that has not been played completely; if the at least one widget has one or more multimedia files that have not been played completely, obtain one or more second posters corresponding to each multimedia file that has not been played completely; and set at least one of the obtained one or more second posters as the wallpaper of a current screen. If it is determined that the enabled preset widget does not exist, the processor obtains one or more third posters corresponding to a user preference, and sets at least one of the obtained one or more third posters as the wallpaper of a current screen, and displays the wallpaper; or if it is determined that the enabled preset widget does not exist, the processor sets at least one of one or more pushed posters that are obtained, as the wallpaper of a current screen, and displays the wallpaper.

In this way, the terminal device can adapt to current different situations, and provide different posters for the user. Content of the desktop widget is extended, and more information is provided for the user without increasing a user operation, thereby improving user experience.

According to a third aspect, a graphical user interface of a terminal device is provided. The terminal device has a display, a memory, and one or more processors configured to execute one or more programs stored in the memory, and the graphical user interface includes:

at least one preset widget widget icon, where at least one shortcut function is preset for the at least one widget icon; and a response is made when a change in a multimedia file of the at least one preset widget is detected, and corresponding wallpaper is displayed, where the corresponding wallpaper includes one or more posters corresponding to a current multimedia file of the at least one preset widget.

In this way, when a multimedia file of a preset widget changes, related information can be adaptively displayed on the wallpaper. This helps a user learn the current change and obtain more related information, improving user experience.

According to a fourth aspect, a graphical user interface of a terminal device is provided. The terminal device has a display, a memory, and one or more processors configured to execute one or more programs stored in the memory, and the graphical user interface includes:

at least one preset widget widget icon, where at least one shortcut function is preset for the at least one widget icon; and a response is made when it is detected that the terminal device displays an unlock screen, and corresponding wallpaper is displayed, where the corresponding wallpaper includes one or more posters corresponding to a current multimedia file, of the at least one preset widget, that has not been played completely.

According to a fifth aspect, a graphical user interface of a terminal device is provided. The terminal device has a display, a memory, and one or more processors configured to execute one or more programs stored in the memory, and the graphical user interface includes:

at least one preset widget widget icon, where at least one shortcut function is preset for the at least one widget icon; and a response is made when it is detected that the terminal device is powered on or displays an unlock screen, and corresponding wallpaper is displayed, where the corresponding wallpaper includes one or more posters corresponding to a user preference.

According to a sixth aspect, a graphical user interface of a terminal device is provided. The terminal device has a display, a memory, and one or more processors configured to execute one or more programs stored in the memory, and the graphical user interface includes:

at least one preset widget widget icon, where at least one shortcut function is preset for the at least one widget icon; and a response is made when it is detected that the terminal device is powered on or displays an unlock screen, and corresponding wallpaper is displayed, where the corresponding wallpaper is set based on at least one of one or more pushed posters that are received.

In the foregoing possible implementations of the first aspect to the sixth aspect, the poster is a cover of a music album corresponding to an audio file, or the poster is a publicity poster corresponding to a video file, or the poster is a cover of an ebook, or the poster is a cover of an image collection corresponding to an image.

In the foregoing possible implementations of the first aspect to the sixth aspect, the specified wallpaper is specifically displayed in one or more of the following manners: displaying each piece of wallpaper at a preset time interval; displaying these pieces of wallpaper on the current screen in a preset layout (layout); displaying each piece of wallpaper in a preset sequence; and displaying these pieces of wallpaper in a preset animation manner.

According to a seventh aspect, a computer-readable storage medium is provided and is configured to store a computer program. The computer program includes an instruction used to execute the method in any one of the first aspect or the possible implementations of the first aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to each terminal device with a display. For example, the terminal device may be a mobile phone, a tablet personal computer (Tablet Personal Computer), a media player, a smart TV, a laptop computer (Laptop Computer), a personal digital assistant (PDA), a personal computer (Personal Computer), a mobile Internet device (Mobile Internet Device), or a wearable device (Wearable Device) such as a smartwatch, with a display. This is not limited in the embodiments of the present invention.

The embodiments of the present invention may be applied to a widget widget displayed on the display. A multimedia file mentioned in the embodiments of the present invention includes an audio file, a video file, an ebook, an image, and the like. The video file may be an audio video file. A poster mentioned in the embodiments of the present invention is a cover of a music album corresponding to the audio file, or a publicity poster corresponding to the video file, or a cover of the ebook.

In the embodiments of the present invention, a tablet computer is used as an example for description. After the terminal device is powered on or enters an unlock state, one or more icons are displayed on a home screen. The icons need to include at least one preset widget icon, and may further include an app icon, another widget icon, a folder icon, and the like. A preset widget is a widget in a preset list. The preset list is a list preset at delivery of the terminal device. The list may be edited, including but not limited to addition, deletion, and modification, by a user or another person. The preset list usually includes a name of a widget that supports playback of a multimedia file. The widget corresponding to the name in the list is usually preinstalled at delivery of the terminal device, for example, Huawei Video, Youku Video, or Huawei Music. Certainly, the list may also include a name of another widget that is not preinstalled at delivery but is likely to be installed by the user during use and that is provided by a third party.

Figure 2:
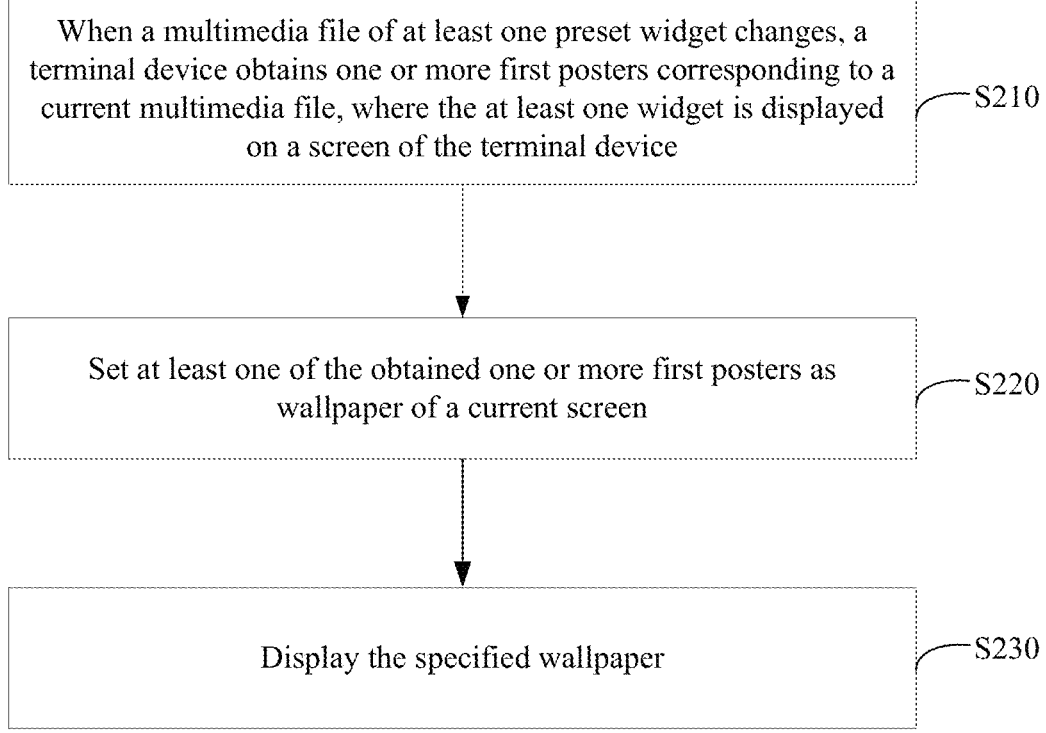
FIG. 2 is a schematic diagram of an embodiment of a method according to the present invention.

FIG. 2 shows an automatic wallpaper setting method according to an embodiment of the present invention. The method 200 is applied to a terminal device with a display. The method 200 may include the following steps:

S210: When a multimedia file of at least one preset widget changes, a terminal device obtains one or more first posters corresponding to a current multimedia file, where the at least one widget is displayed on a screen of the terminal device.

S220: Set at least one of the obtained one or more first posters as wallpaper of a current screen.

S230: Display the specified wallpaper.

Specifically, for a preset widget, such as Huawei Video widget, displayed on a home screen (Home screen, home page, main screen) of the terminal device, when it is detected that a multimedia file of the widget changes, for example, when a user operation of selecting a next video is detected on Huawei Video widget, for example, when a currently played video displayed on Huawei Video widget changes (the next video is played automatically), the terminal device performs same actions. The following describes, by using an example in which a user operation is detected on a widget, that the terminal device performs the same actions when the widget automatically plays a next multimedia file.

For example, when a user clicks a "next" (NEXT/next/▶▶) key or a "previous" (PREVIOUS/previous/◀◀) key of Huawei Video widget on the home screen, the widget switches from a current video name to a next video name, such as "Zootopia." The terminal device obtains a poster corresponding to a current video file, in other words, a poster corresponding to a "Zootopia" video file. A poster may be obtained from a poster file corresponding to a video file, or a poster corresponding to a multimedia file may be obtained from a network. One or more posters may be obtained. The terminal device sets the obtained poster as the wallpaper of the current home screen. Specifically, if only one poster is obtained, the poster is displayed. If a plurality of posters are obtained, the posters may be displayed in different manners provided by a wallpaper functional circuit. The manners may include but are not limited to: displaying each poster randomly or sequentially at a time interval, such as 30 seconds; displaying each combined poster randomly or sequentially according to a preset layout rule, such as combining two posters into one poster; and displaying each poster according to a preset animation rule. The displayed poster may alternatively be a subset of the obtained poster. The specified wallpaper may be displayed only on the home screen on which Huawei Video widget is located, or may be displayed on all screens of the terminal device.

If there are a plurality of preset widgets on the screen of the terminal device, whether multimedia files of the preset widgets change may be checked in turn or in a preset priority order. A response may be made after all the preset widgets are checked, or a response may be made once a change in a multimedia file is detected. If there are a plurality of preset widgets on the screen of the terminal device and it is detected that multimedia files of a plurality of preset widgets change, a response may be made only to a change, in a multimedia file, detected last time, or a response may be made only to a change in a widget that is opened last, or a response may be made only to a change in a widget that is most frequently used by the user, or the like. This is not limited in this embodiment of the present invention.

When detecting that a multimedia file of a preset widget changes, the terminal device obtains a poster corresponding to a changed multimedia file, and sets the obtained poster as the wallpaper of the current screen. More information about the current multimedia file may be displayed on the home screen that is much larger than a widget display area. Related information about the current multimedia file of the preset widget may be synchronously updated for the user without a need to perform an extra operation by the user. Therefore, this can improve user experience, and enhance intelligence of human-computer interaction.

Optionally, when the terminal device displays an unlock screen, and it is determined that a user enables the at least one widget widget in a preset list, the terminal device determines whether the enabled one or more widgets have a multimedia file that has not been played completely. If the enabled one or more widgets have one or more multimedia files that have not been played completely, the terminal device obtains one or more posters corresponding to at least one multimedia file that has not been played completely, sets at least one of the obtained one or more posters as the wallpaper of the current screen, and displays the specified wallpaper on the screen.

For example, when the terminal device displays the unlock screen, the terminal device checks whether there is a preset widget in a running state. The running state may be a background running state. It is assumed that the terminal device determines that the preset widget in the running state has a multimedia file that has not been played completely. For example, the user opens Huawei Video to watch a movie "Zootopia", and pauses the movie for dinner after watching half of the movie. When the user comes back and enters the unlock screen again, the terminal device can determine that the user enables the preset widget (Huawei Video), and the widget has a video file that has not been played completely. Then, the terminal device obtains the video file, that is, a poster corresponding to a video file that is corresponding to the movie "Zootopia." The poster may be obtained from a poster file corresponding to the video file. For example, if one poster is obtained, the poster is set as wallpaper of a home screen where Huawei Video is located. Certainly, the poster may be used as wallpaper of all home screens of the terminal device. If a plurality of posters are obtained, the terminal device may select only one as the wallpaper, or may use each obtained poster as the wallpaper, or may use part of the obtained posters as the wallpaper. Specifically, for selection of only one as the wallpaper, the terminal device may select any one as the wallpaper, or select a poster with a highest priority, or prompt the user for selection, or select a poster based on a manner/function provided by a wallpaper functional unit; for use of each obtained poster as the wallpaper, the terminal device may match a corresponding layout (layout) template based on a quantity of the posters to generate the wallpaper, and may display each poster randomly or according to another sequence rule at a preset time interval, or may select a preset animation template and display each poster in an animation manner; for use of the part of the obtained posters as the wallpaper, if only one is to be selected, refer to the case of selecting only one as the wallpaper, and if a plurality of posters are to be selected, refer to the case of using each obtained poster as the wallpaper. The poster selection and wallpaper setting method in this embodiment may be applied to other embodiments in this application file. Poster selection and wallpaper setting methods in the other embodiments may also be applied to this embodiment. The poster selection and wallpaper setting methods mentioned in this application file are applicable for all embodiments.

It is assumed that the terminal device determines that a plurality of preset widgets enabled by the user have multimedia files that have not been played completely. For example, the user opens Huawei Video and watches a movie "Zootopia." After watching half of the movie, the user pauses the movie, opens Huawei Music, and chooses to play a song "Dream it possible" ("Dream it possible"). After listening to half of the song, the user pauses the song to answer a call. When the user finishes the call and enters the unlock screen again, the terminal device can determine that the user enables the preset widgets (Huawei Video and Huawei Music). The terminal device may only determine whether a preset widget that is opened last has a multimedia file that has not been played completely, that is, determine whether Huawei Music has an audio file that has not been played completely. The terminal device may alternatively determine whether each preset widget that is enabled, that is, each of the two widgets of Huawei Video and Huawei Music, has a multimedia file that has not been played completely, that is, determine whether Huawei Video has a video file that has not been played completely, and whether Huawei Music has an audio file that has not been played completely. After determining that there is a multimedia file that has not been played completely, the terminal device obtains a poster corresponding to the multimedia file that has not been played completely. If there is only one multimedia file that has not been played completely, the terminal device obtains a poster corresponding to the multimedia file, and sets the one or more obtained posters as the wallpaper, as described in the foregoing. For specific information about poster obtaining and wallpaper setting, refer to the foregoing related descriptions. If there are a plurality of multimedia files that have not been played completely, the terminal device obtains posters corresponding to the multimedia files, and then performs wallpaper setting by referring to processing of the plurality of posters. For example, the terminal device obtains a poster corresponding to a video file that is corresponding to the movie "Zootopia", and obtains a cover of a music album corresponding to an audio file that is corresponding to the song "Dream it possible". The terminal device may obtain the poster from a poster file corresponding to the audio file; or may obtain, according to a preset rule, posters corresponding to only part of the multimedia files, and then perform poster setting; or may determine, according to a preset filtering rule, a target poster from the obtained posters corresponding to the multimedia files and then perform wallpaper setting.

When the terminal device displays the unlock screen, and determines that a widget enabled by the user has a multimedia file that has not been played completely, the terminal device obtains a poster corresponding to at least one multimedia file that has not been played completely, and sets the obtained poster as the wallpaper. When entering the unlock screen, the user may learn of information about the current multimedia file from the home screen that is much larger than a widget display area. The user may be reminded of multimedia that is not watched or listened to completely by the user last time. Therefore, this can improve user experience, and enhance intelligence of human-computer interaction. In addition, the wallpaper of the unlock screen may simultaneously vary with the multimedia that is not watched completely by the user last time. This can increase interest of using the terminal device by the user, and bring about more personalized user experience.

Optionally, when the terminal device is powered on or displays an unlock screen, the terminal device determines a user preference based on historical playback data, collected by a system, of the at least one widget, obtains a corresponding poster based on the preference, sets the obtained poster as the wallpaper, and displays the specified wallpaper. A difference between this embodiment and the foregoing embodiment is that a process of obtaining the corresponding poster based on the user preference and setting the wallpaper is the same as the foregoing related descriptions. Specifically, for example, when the terminal device is powered on or displays the unlock screen, the terminal device determines the user preference based on historical playback data, collected by the system, of a preset widget enabled last by a user, or based on historical playback data, collected by the system, of all preset widgets enabled by a user, or based on historical playback data, collected by the system, of one or more preset widgets that are most frequently used by a user. The user preference may include at least one of a preference for an audio, a preference for a video, a preference for an ebook, and a preference for an image. The preference for the audio may be, for example, rock and roll, folk music, blues, country, pop, jazz, classical, a nursery rhyme, and religious music; the preference for the video may be, for example, an action movie, a romance movie, a thriller, an animation, a comedy, a documentary, a children's movie, a technology video, and a finance and economics video. The preference for the ebook may be a classic, an animation, a suspense book, a romance book, a finance and economics book, a reference book, and the like. The preference for the image may be a scenery image, an image of people, a macro image, a sport image, and the like. There may be one or more determined preferences. A corresponding poster is determined based on the determined preference, and one or more posters that are obtained are set as the wallpaper of the current home screen. For poster obtaining and wallpaper setting, still refer to the description in the foregoing embodiment. Details are not described herein again. In addition, optionally, when the terminal device displays an unlock screen, and it is determined that a user enables the at least one widget widget in a preset list, the terminal device determines a user preference based on historical playback data, collected by a system, of at least one of the at least one widget, obtains a corresponding poster based on the preference, sets the obtained poster as the wallpaper, and displays the specified wallpaper. That is, when the terminal device displays the unlock screen, the terminal device performs, only when it is determined that a preset widget enabled by the user exists, association setting on current content of the preset widget and the wallpaper. If there is no enabled preset widget currently, the wallpaper is displayed normally.

When the terminal device is powered on or displays the unlock screen, the terminal device may determine the user preference based on the historical data collected by the system, and displays the wallpaper corresponding to the preference. When powering on the terminal device or entering the unlock screen, the user may learn of information about a multimedia file recommended by the system from the screen that is much larger than a widget display area. This can reduce time of the user for learning of information about multimedia that the user may like, therefore improving user experience, and enhancing intelligence of human-computer interaction. Moreover, a recommended poster is displayed on the wallpaper based on the user preference only after it is determined that the user enables the at least one widget widget in the preset list. In this way, an audio or a video that the user may be interested in is recommended to the user only when the user is willing to listen to an audio or watch a video. Therefore, this can accurately meet a user requirement, and enhance intelligence of the terminal device.

Optionally, the terminal device may also obtain one or more pushed posters from a network side. These pushed posters may be pushed to a corresponding preset widget. When the terminal device is powered on or displays an unlock screen, the terminal device sets the wallpaper of the screen based on the pushed poster that is obtained. For a process of setting the one or more obtained posters as the wallpaper, refer to the foregoing embodiment. Details are not described herein again. When the terminal device is powered on or displays the unlock screen, content of the pushed poster may be automatically displayed on the wallpaper. When powering on the terminal device or entering the unlock screen, a user may learn of information about a currently pushed multimedia file from the screen that is much larger than a widget display area. This can reduce time of the user for learning of information about multimedia that the user may like, or that is the latest, or that is the most popular, therefore improving user experience, and enhancing intelligence of human-computer interaction. In addition, the user can see different poster wallpaper each time the user powers on the terminal device or enters the unlock screen. This enriches desktop content of the user, improves a feeling of personalized experience, and enhances intelligence of the terminal device.

Optionally, when the terminal device displays an unlock screen, it may be preferentially determined whether a user enables the at least one widget widget in a preset list. If it is determined that one or more widgets are enabled, the terminal device determines whether there is a multimedia file that has not been played completely. If there are one or more multimedia files that have not been played completely, the terminal device obtains one or more posters corresponding to the at least one multimedia file that has not been played completely, sets at least one of the obtained one or more posters as the wallpaper of the current screen, and displays the specified wallpaper on the screen. If it is determined that no preset widget is enabled, the terminal device determines user preference based on historical playback data collected by a system, obtains a corresponding poster based on the preference, and sets and displays the wallpaper. For preference determining, poster obtaining, and wallpaper setting, refer to the foregoing embodiment. Details are not described herein again. If it is determined that no preset widget is enabled, the terminal device may alternatively set a pushed poster that is obtained as the wallpaper and display the wallpaper. For specific information about poster obtaining and wallpaper setting, refer to the foregoing embodiment. Certainly, the two solutions of obtaining the wallpaper based on the user preference and using the pushed poster as the wallpaper may overlap, that is, a part preferred by the user is obtained from the pushed poster and is used as the wallpaper, or the pushed poster received by the terminal device is selected based on the user preference. Alternatively, the user preference may be determined first. If the user preference cannot be determined (for example, the user has never watched a multimedia file, or a quantity of multimedia files watched by the user is too small, or quantities of various types of multimedia files are almost the same), the wallpaper is set based on the pushed poster that is obtained. Alternatively, one or more posters preferred by the user may be selected from the pushed posters that are obtained and be set as the wallpaper. Alternatively, one or more posters of a same type as a multimedia file that has not been played completely by a current preset widget may be determined from the pushed posters that are obtained, and be set and displayed as the wallpaper. A same type means that audio files belong to one of the following types: rock and roll, folk music, blues, country, pop, jazz, classical, a nursery rhyme, religious music, and the like; video files belong to one of the following types: an action movie, a romance movie, a thriller, an animation, a comedy, a documentary, a children's movie, a technology video, a finance and economics video, and the like; ebooks belong to one of the following types: a classic, an animation, a suspense book, a romance book, a finance and economics book, a reference book, and the like; images belong to one of the following types: a scenery image, an image of people, a macro image, a sport image, and the like. Alternatively, one or more posters with a same attribute as a multimedia file that has not been played completely by a current preset widget may be determined from the pushed posters that are obtained, and be set and displayed as the wallpaper. The attribute may be but is not limited to at least one of the following attributes: a hero, a heroine, a director, a record company, a singer, a movie/album name, a release time, and the like. By executing the solution in this embodiment, the terminal device can update wallpaper content intelligently. This can provide richer information for the user, improve user experience, and enhance intelligence of terminal device.

It should be noted that these examples listed in the foregoing embodiment are merely intended to help a person skilled in the art better understand the embodiments of the present invention, but are not intended to limit the scope of the embodiments of the present invention. Obviously, a person skilled in the art can make various equivalent modifications or variations based on these examples, and such modifications or variations shall also fall within the scope of the embodiments of the present invention.

Figure 1:
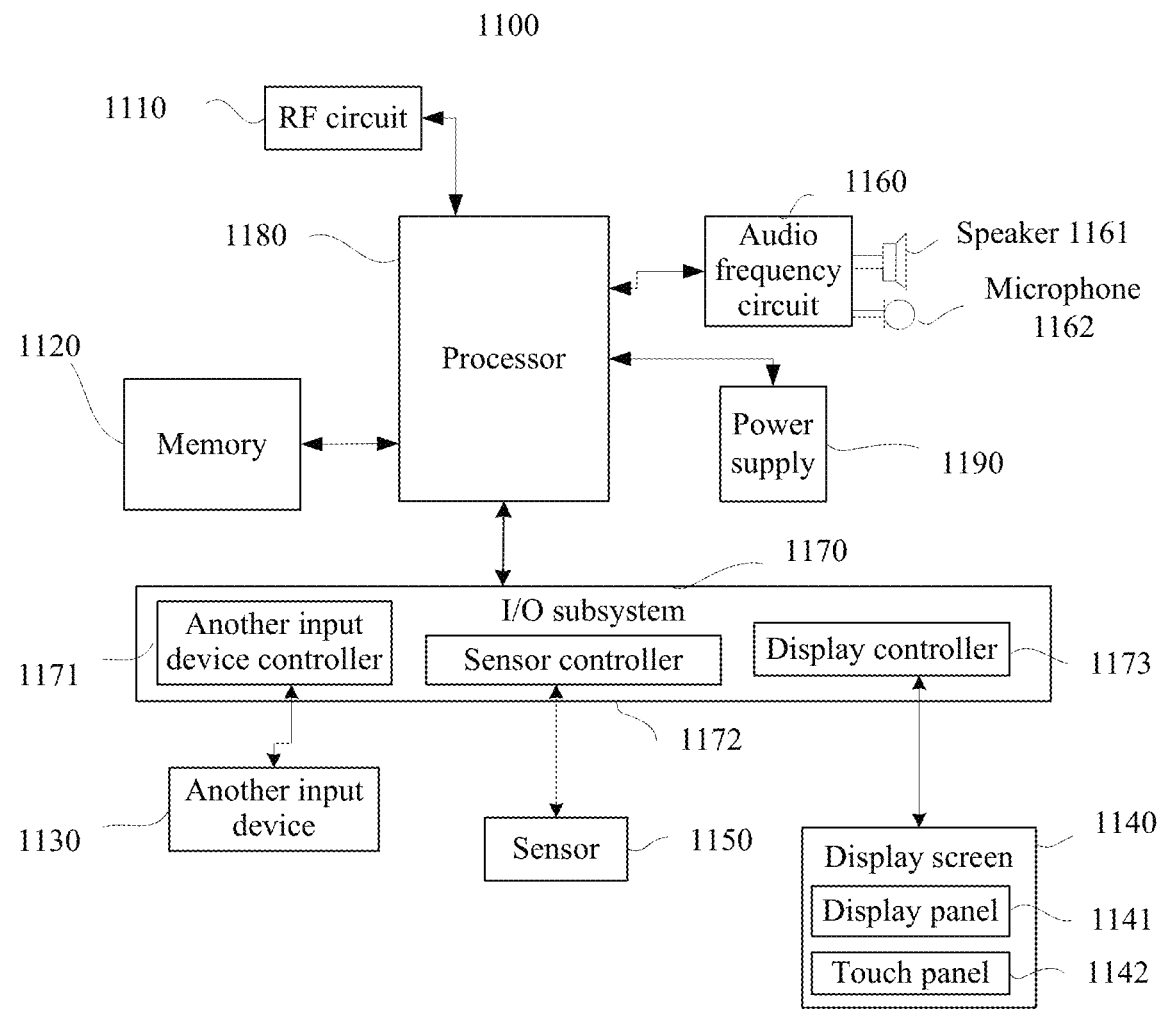
FIG. 1 is a schematic diagram of a partial structure of an embodiment of a terminal device according to the present invention.

FIG. 1 shows a block diagram of a partial structure of a terminal device 1100 related to the embodiments of the present invention. The terminal device can implement the automatic wallpaper setting method described in the foregoing embodiment. As shown in FIG. 1, the terminal device 1100 includes components such as an RF (Radio Frequency, radio frequency) circuit 1110, a memory 1120, another input device 1130, a display 1140, a sensor 1150, an audio frequency circuit 1160, an I/O subsystem 1170, a processor 1180, and a power supply 1190. A person skilled in the art can understand that the terminal structure shown in FIG. 1 does not constitute a limitation to the terminal device, and the terminal device may include more or fewer components than those shown in the figure, or some components may be combined, or some components may be split, or the components may be disposed in a different manner.

The following describes the constituent components of the terminal device 1100 in detail with reference to FIG. 1.

The RF circuit 1110 may be configured to receive and transmit information, or receive and send a signal in a call process. In particular, after receiving downlink information of a base station, the RF circuit 1110 sends the downlink information to the processor 1180 for processing. In addition, the RF circuit 1110 sends related uplink data to the base station. Usually, the RF circuit 1110 includes but is not limited to an antenna, at least one amplifier, a transceiver, a coupler, an LNA (Low Noise Amplifier, low noise amplifier), a duplexer, and the like. In addition, the RF circuit 1110 may further communicate with a network and another device through wireless communication.

The memory 1120 may be configured to store a software program and a file such as an audio, a video, an ebook, an image, or wallpaper. The processor 1180 runs the software program and the module that are stored in the memory 1120, so as to perform various function applications and data processing of the terminal device 1100. The memory 1120 may mainly include a program storage area and a data storage area. The program storage area may store an operating system, an application program required by at least one function (such as a voice playback function and an image playback function), and the like. The data storage area may store data (such as audio data, video data, ebook data, image data, and wallpaper) that is created based on use of the terminal 1100, and the like. In addition, the memory 1120 may include a high-speed random access memory, and may further include a non-volatile memory such as at least one magnetic disk storage device, a flash memory device, or another volatile solid-state storage device.

The another input device 1130 may be configured to receive entered digit or character information, and generate key signal input related to user setting and function control of the terminal 1100. Specifically, the another input device 1130 may include but is not limited to one or more of a physical keyboard, a function key (such as a volume control key or an on/off key), a trackball, a mouse, a joystick, an optical mouse (the optical mouse is a touch sensitive surface that does not display visual output, or an extension of a touch sensitive surface formed by a touchscreen), and the like. The another input device 1130 is connected to an another input device controller 1171 of the I/O subsystem 1170, and exchanges a signal with the processor 1180 under control of the another input device controller 1171.

The display 1140 may be configured to display information entered by a user or information provided for the user, and an application program of the terminal 1100, and may further receive user input. The display 1140 may specifically include a display panel 1141 and a touch panel 1142. The display panel 1141 may be configured in a form such as an LCD (Liquid Crystal Display, liquid crystal display) or an OLED (Organic Light-Emitting Diode, organic light-emitting diode). The touch panel 1142, also referred to as a touchscreen, a touch sensitive screen, or the like, may collect a touch or non-touch operation performed by the user on or near the touch panel 1142 (for example, an operation performed on the touch panel 1142 or near the touch panel 1142 by the user by using a finger, a stylus, or any other suitable object or accessory, or a somatosensory operation may also be included; and the operation includes a single-point control operation, a multipoint control operation, or an operation of another type), and drive a corresponding connection apparatus according to a preset program. Optionally, the touch panel 1142 may include two parts: a touch detection apparatus and a touch controller. The touch detection apparatus detects a touch orientation and posture of the user, detects a signal generated by a touch operation, and transmits the signal to the touch controller. The touch controller receives touch information from the touch detection apparatus, converts the touch information into information that can be processed by the processor, and sends the information to the processor 1180, and can receive and execute a command sent by the processor 1180. In addition, the touch panel 1142 may be implemented in a plurality of types, such as a resistive type, a capacitive type, an infrared type, and a surface acoustic wave type, and the touch panel 1142 may also be implemented by using any technology to be developed in the future. Further, the touch panel 1142 may cover the display panel 1141. The user may perform, based on content displayed on the display panel 1141 (where the displayed content includes but is not limited to a soft keyboard, a virtual mouse, a virtual key, an icon, and the like), an operation on or near the touch panel 1142 that covers the display panel 1141. When detecting the operation on or near the touch panel 1142, the touch panel 1142 transmits the operation to the processor 1180 through the I/O subsystem 1170 to determine user input. Then, the processor 1180 provides, based on the user input, corresponding visual output on the display panel 1141 through the I/O subsystem 1170. Although the touch panel 1142 and the display panel 1141 in FIG. 1 are used as two separate components to implement input and input functions of the terminal 1100, in some embodiments, the touch panel 1142 and the display panel 1141 may be integrated to implement the input and output functions of the terminal 1100. The display panel can display, based on an instruction of the processor, various data in a preset manner, for example, display related information about a multimedia file in a widget display area, such as a movie/song name, total playback duration and remaining duration, and a previous/next virtual operation key, and for example, display wallpaper on a home screen in a specified display manner, such as static display, animated display, or display of static images switched at a preset time interval.

The terminal 1100 may further include at least one sensor 1150, such as a light sensor, a motion sensor, and another sensor. The light sensor may specifically include an ambient light sensor and a proximity sensor. As a type of motion sensor, an accelerometer sensor may detect magnitudes of accelerations in various directions (usually, three axes), may detect a magnitude and a direction of gravity when the terminal device is stationary, and may be used in an application used for recognizing a mobile terminal posture (such as landscape-portrait mode switching, a related game, or magnetometer posture calibration), a vibration recognition-related function (such as a pedometer function or tapping), and the like. For another sensor that can be disposed in the terminal 1100, such as a gyroscope, a barometer, a hygrometer, a thermometer, or an infrared sensor, details are not described herein.

The audio frequency circuit 1160, a speaker 1161, and a microphone 1162 may provide an audio interface between the user and the terminal 1100. The audio frequency circuit 1160 may transmit, to the speaker 1161, a signal converted from received audio data, and the speaker 1161 converts the signal into a sound signal for output. In addition, the microphone 1162 converts a collected sound signal into a signal, and the audio frequency circuit 1160 receives the signal and converts the signal into audio data, and then outputs the audio data to the RF circuit 1110, so that the audio data is sent to, for example, another mobile terminal, or outputs the audio data to the memory 1120 for further processing.

The I/O subsystem 1170 is configured to control an external input/output device, and may include the another input device controller 1171, a sensor controller 1172, and a display controller 1173. Optionally, one or more another input device controllers 1171 receive a signal from the another input device 1130, and/or send a signal to the another input device 1130. The another input device 1130 may include a physical button (a push button, a rocker button, or the like), a dial, a slider switch, the joystick, a click scroll wheel, and the optical mouse (the optical mouse is the touch sensitive surface that does not display the visual output, or the extension of a touch sensitive surface formed by the touchscreen). It should be noted that the another input device controller 1171 may be connected to any or more of the foregoing devices. The display controller 1173 in the I/O subsystem 1170 receives a signal from the display 1140 and/or sends a signal to the display screen 1140. When the display screen 1140 detects user input, the display controller 1173 converts the detected user input into interaction with a user interface object displayed on the display screen 1140, so as to implement human-computer interaction. The sensor controller 1172 may receive a signal from one or more sensors 1150 and/or send a signal to one or more sensors 1150.

The processor 1180 is a control center of the terminal 1100, and connects various parts of the entire mobile terminal by using various interfaces and lines. By running or executing the software program and/or the module that is stored in the memory 1120 and by invoking data stored in the memory 1120, the processor 1180 performs various functions of the terminal 1100 and processes data, to perform overall monitoring on the mobile terminal. Optionally, the processor 1180 may include one or more processors or processing modules. Preferably, the processor 1180 may integrate an application processor and a modem processor. The application processor mainly processes the operating system, a user interface, the application program, and the like. The modem processor mainly processes wireless communication. Optionally, the processor 1180 may include an integrated circuit (Integrated Circuit, IC for short), for example, may include a single packaged IC, or may include a plurality of connected packaged ICs that have a same function or different functions. For example, the processor may include only a central processing unit (Central Processing Unit, CPU for short), or may be a combination of a GPU, a digital signal processor (Digital Signal Processor, DSP for short), and a control chip (such as a baseband chip) in a communications unit. In an implementation of the present invention, the CPU may be a single computing core, or may include a plurality of computing cores.

It can be understood that the terminal may alternatively combine the memory and the processor, or the processor of the terminal may alternatively invoke an instruction in the processor to perform various functions of the terminal, and does not invoke the data in the memory to execute the functions. This is not limited in this embodiment of the present invention.

The terminal 1100 further includes the power supply 1190 (such as a battery) that supplies power to various components. Preferably, the power supply may be logically connected to the processor 1180 by using a power supply management system, so that functions such as charging management, discharging management, and power consumption management are implemented by using the power supply management system.

The terminal 1100 may further include a camera, a Bluetooth module, a Wireless Fidelity (Wireless-Fidelity, Wi-Fi or WiFi) module, and the like though they are not shown, and details are not described herein.

FIG. 1 is a block diagram of a general structure of the mobile terminal. It can be understood that a different mobile terminal may include more or fewer structures than those shown in FIG. 1. For example, the mobile terminal may further include structures such as the Bluetooth module, the WiFi module, and an infrared module.

The one or more processors included in the processor 1180 may be configured to invoke the instruction in the memory to execute the foregoing automatic wallpaper setting method.

The automatic wallpaper setting method that the processor 1180 is configured to execute may include: when the terminal device displays an unlock screen, and it is determined that a user enables at least one widget widget, determining whether the at least one widget has a multimedia file that has not been played completely; if the at least one widget has one or more multimedia files that have not been played completely, obtaining one or more posters corresponding to at least one multimedia file that has not been played completely; and setting at least one of the obtained posters as wallpaper of a current screen, and displaying the wallpaper.

Optionally, the automatic wallpaper setting method that the processor 1180 is configured to execute may include: when a multimedia file of at least one preset widget widget displayed on the display changes, obtaining at least one of one or more corresponding first posters in a current multimedia file, setting at least one of the obtained one or more first posters as wallpaper of a current screen, and displaying the wallpaper.

Optionally, the processor 1180 is further configured to: when an operation performed on a previous or next key of at least one preset widget is detected, perform an action of obtaining at least one of one or more corresponding posters corresponding to a current multimedia file.

Optionally, the automatic wallpaper setting method that the processor 1180 is configured to execute may include: when the terminal device is powered on or displays an unlock screen, determining a user preference based on historical playback data, collected by the terminal device, of at least one preset widget widget; obtaining one or more corresponding third posters based on the preference; setting at least one of the obtained one or more third posters as wallpaper of a current screen; and displaying the specified wallpaper.

Optionally, the automatic wallpaper setting method that the processor 1180 is configured to execute may include: obtaining one or more posters pushed to the terminal device; when the terminal device is powered on or displays an unlock screen, and it is determined that a user enables at least one preset widget widget, setting at least one of the obtained one or more posters as wallpaper of a current screen; and displaying the specified wallpaper.

Optionally, the automatic wallpaper setting method that the processor 1180 is configured to execute may include: when the terminal device in which the processor is located displays an unlock screen, first determining whether a user enables at least one preset widget widget; and if it is determined that the at least one preset widget is in an opened state, determining whether the at least one widget has a multimedia file that has not been played completely, if the at least one widget has one or more multimedia files that have not been played completely, obtaining one or more posters corresponding to at least one multimedia file that has not been played completely, setting at least one of the obtained one or more posters as wallpaper of a current screen, and displaying the specified wallpaper; if it is determined that no preset widget is in an opened state, determining a user preference based on historical playback data, collected by the terminal device, of one or more preset widgets, obtaining a corresponding poster based on the determined preference, setting the obtained poster as wallpaper, and displaying the wallpaper; if it is determined that no preset widget is in an opened state, and a user preference cannot be determined, setting a pushed poster that is obtained, as wallpaper, and displaying the wallpaper; or if it is determined that no preset widget is in an opened state, setting one or more pushed posters that are obtained and that are in accordance with a user preference as wallpaper, and displaying the wallpaper.

Optionally, the automatic wallpaper setting method that the processor 1180 is configured to execute may include: when the terminal device in which the processor is located displays an unlock screen, if a user enables at least one preset widget widget, and if the at least one widget has a multimedia file that has not been played completely, obtaining one or more posters corresponding to at least one multimedia file that has not been played completely, and at the same time obtaining one or more posters corresponding to a determined user preference; setting at least one of all the obtained posters as wallpaper of a current screen; and displaying the specified wallpaper.

Optionally, the automatic wallpaper setting method that the processor 1180 is configured to execute may include: when the terminal device in which the processor is located displays an unlock screen, if a user enables at least one preset widget widget, and if the at least one widget has a multimedia file that has not been played completely, obtaining one or more posters corresponding to at least one multimedia file that has not been played completely, and at the same time obtaining one or more posters pushed by a network; setting at least one of all the obtained posters as wallpaper of a current screen; and displaying the specified wallpaper.

Optionally, the automatic wallpaper setting method that the processor 1180 is configured to execute may include: when the terminal device in which the processor is located displays an unlock screen, if a user enables at least one preset widget widget, and if the at least one widget has a multimedia file that has not been played completely, obtaining one or more posters corresponding to at least one multimedia file that has not been played completely, and at the same time selecting one or more posters corresponding to a user preference from obtained posters that are pushed by a network; setting at least one of all the obtained posters as wallpaper of a current screen; and displaying the specified wallpaper.

Optionally, the specified wallpaper is displayed in one or more of the following manners: displaying each piece of wallpaper at a preset time interval; displaying these pieces of wallpaper on the current screen in a preset layout (layout); displaying each piece of wallpaper in a preset sequence; and displaying these pieces of wallpaper in a preset animation manner.

Optionally, an operation on a previous or next key of a preset widget may be a direct operation on a virtual key performed by the user, or may be a gesture operation, a floating operation, an operation on a physical key, or the like.

According to the foregoing terminal device embodiments provided in the present invention, wallpaper can be automatically displayed and switched intelligently, so that the user may obtain more useful information from a screen without an extra operation and effort. This can improve efficiency of using the terminal device by the user, enhance intelligence of the terminal device, and increase product competitiveness.

In an implementation process, the steps in the foregoing methods can be implemented by using a hardware integrated logical circuit in the processor, or by using an instruction in a form of software. The steps of the method disclosed with reference to the embodiments of the present invention may be directly performed by a hardware processor, or may be performed by using a combination of hardware in the processor and a software module. The software module may be located in a mature storage medium in the art, such as a random memory, a flash memory, a read-only memory, a programmable read-only memory, an electrically erasable programmable memory, a register, or the like. The storage medium is located in the memory, and the processor executes an instruction in the memory and completes the steps in the foregoing methods in combination with hardware of the processor. To avoid repetition, details are not described herein again.

The foregoing describes in detail the terminal device in the embodiments of the present invention with reference to FIG. 1. The following describes in detail a graphical user interface of a terminal device in the embodiments of the present invention with reference to FIG. 3 and FIG. 4.

Figure 3:
FIG. 3 is a schematic diagram of a graphical user interface according to an embodiment of the present invention.
Figure 4:
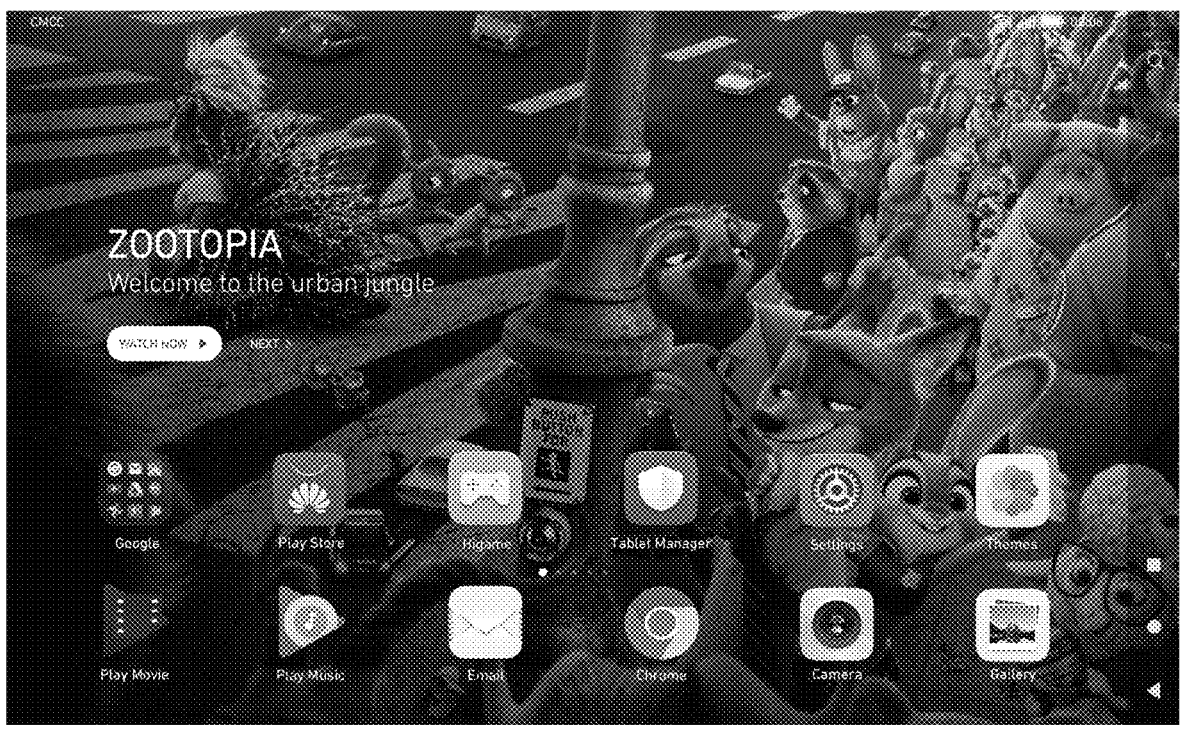
FIG. 4 is a schematic diagram of another graphical user interface according to an embodiment of the present invention.

An embodiment of the present invention provides a graphical user interface of a terminal device, for example, FIG. 3 and FIG. 4. The terminal device has a display, a memory, and one or more processors configured to execute one or more programs stored in the memory. The graphical user interface includes: at least one preset widget widget icon, where at least one shortcut function is preset for the at least one widget icon.

A response is made when a change in a multimedia file of at least one preset widget is detected, and corresponding wallpaper is displayed. The corresponding wallpaper includes one or more posters corresponding to a current multimedia file of the at least one preset widget. For example, wallpaper in FIG. 3 is a cover of an album corresponding to a current audio file in an audio playback widget. For example, wallpaper in FIG. 4 is a poster corresponding to a current video file in a video playback widget.

Optionally, that a response is made when a change in a multimedia file of the at least one preset widget is detected, and corresponding wallpaper is displayed is specifically: the response is made when an operation on a previous or next shortcut function of the at least one widget is detected, and the corresponding wallpaper is displayed.

An embodiment of the present invention further provides a graphical user interface of a terminal device. The terminal device has a display, a memory, and one or more processors configured to execute one or more programs stored in the memory. The graphical user interface includes: at least one preset widget widget icon, where at least one shortcut function is preset for the at least one widget icon.

A response is made when it is detected that the terminal device displays an unlock screen, and corresponding wallpaper is displayed. The corresponding wallpaper includes one or more posters corresponding to a current multimedia file, of at least one preset widget, that has not been played completely. The corresponding wallpaper is set based on at least one of one or more posters corresponding to one or more multimedia files that have not been played completely.

An embodiment of the present invention further provides a graphical user interface of a terminal device. The terminal device has a display, a memory, and one or more processors configured to execute one or more programs stored in the memory. The graphical user interface includes: at least one preset widget widget icon, where at least one shortcut function is preset for the at least one widget icon. A response is made when it is detected that the terminal device is powered on or displays an unlock screen, and corresponding wallpaper is displayed. The corresponding wallpaper includes one or more posters corresponding to a user preference.

An embodiment of the present invention further provides a graphical user interface of a terminal device. The terminal device has a display, a memory, and one or more processors configured to execute one or more programs stored in the memory. The graphical user interface includes: at least one preset widget widget icon, where at least one shortcut function is preset for the at least one widget icon. A response is made when it is detected that the terminal device is powered on or displays an unlock screen, and corresponding wallpaper is displayed. The corresponding wallpaper includes one or more pushed posters that are received by the terminal device.

An embodiment of the present invention further provides a graphical user interface of a terminal device. The terminal device has a display, a memory, and one or more processors configured to execute one or more programs stored in the memory. The graphical user interface includes: at least one preset widget widget icon, where at least one shortcut function is preset for the at least one widget icon. A response is made when it is detected that the terminal device is powered on or displays an unlock screen, and corresponding wallpaper is displayed. The corresponding wallpaper includes a combination of at least two of the following: one or more posters corresponding to a current multimedia file, of at least one widget, that has not been played completely, one or more pushed posters that are received, and one or more posters corresponding to a user preference.

Optionally, the wallpaper display includes but is not limited to static display or animated display of the wallpaper, or display of static wallpaper at a preset time interval, or display of static wallpaper in a preset sequence.

A person of ordinary skill in the art may be aware that, in combination with the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An automatic wallpaper setting method performed by a terminal device, comprising:
   displaying a preset widget on a screen of the terminal device;
   obtaining a poster corresponding to a current multimedia file in response to the current multimedia file of the preset widget changing;
   setting the poster as a wallpaper of the screen; and
   displaying the poster corresponding to the current multimedia file of the preset widget as the wallpaper on the screen behind the displayed preset widget.

2. The automatic wallpaper setting method of claim 1, wherein obtaining the poster corresponding to the current multimedia file comprises obtaining the poster corresponding to the current multimedia file in response to detecting an operation performed on a previous or next key of the preset widget.

3. The automatic wallpaper setting method of claim 1, wherein in response to the terminal device displaying an unlock screen and a user enabling the preset widget, the method further comprises:
   determining whether the preset widget has a multimedia file that has not been played completely;
   obtaining a second poster corresponding to the multimedia file that has not been played completely in response to the preset widget having the multimedia file that has not been played completely; and
   setting the second poster as the wallpaper of the screen.

4. The automatic wallpaper setting method of claim 1, wherein, in response to the terminal device being powered on or displaying an unlock screen, the method further comprises:
   determining a user preference based on historical playback data collected by the terminal device of the preset widget;
   obtaining a second poster based on the user preference; and
   setting the second poster as the wallpaper of the screen.

5. The automatic wallpaper setting method of claim 1, further comprising:
   obtaining a second poster pushed to the terminal device;
   determining that a user enables the preset widget in response to the terminal device being powered on or displaying an unlock screen; and
   setting the second poster as the wallpaper of the screen.

6. The automatic wallpaper setting method of claim 1, wherein setting the poster as the wallpaper of the screen comprises setting at least two first posters as the wallpaper of the screen, and wherein displaying the wallpaper on the screen of the terminal device comprises displaying portions of the at least two first posters as the wallpaper in a preset manner.

7. The automatic wallpaper setting method of claim 6, wherein the displaying the portions of the at least two first posters as the wallpaper in the preset manner comprises at least one of the following:
   displaying each portion of the at least two first posters at a preset time interval;
   displaying the portions of the at least two first posters on the screen in a preset layout;
   displaying each portion of the at least two first posters in a preset sequence; or
   displaying the portions of the at least two first posters in a preset animation manner.

8. The automatic wallpaper setting method of claim 1, wherein the current multimedia file is at least one of an audio file, a video file, an electronic book (ebook), or an image, and wherein the poster is at least one of a cover of a music album corresponding to the audio file, a publicity poster corresponding to the video file, a cover corresponding to the ebook, or a cover of an image collection corresponding to the image.

9. The automatic wallpaper setting method of claim 1, wherein the method further comprises obtaining the poster corresponding to the current multimedia file in response to detecting an operation performed on the preset widget or in response to performing a function on an app corresponding to the preset widget.

10. A terminal device, comprising:
   a display configured to:
      display an operation interface corresponding to a function provided by the terminal device, wherein the operation interface displays a preset widget; and
      display a specified wallpaper behind the displayed preset widget;
   a memory configured to store a multimedia file, a wallpaper, and instructions; and
   a processor coupled to the display and the memory, wherein the processor is configured to execute the instructions which cause the processor to be configured to:
      obtain a poster corresponding to a current multimedia file in response to the current multimedia file of the preset widget changing; and
      set the poster as the wallpaper.

11. The terminal device of claim 10, wherein the instructions further cause the processor to be configured to obtain the poster corresponding to the current multimedia file in response to detecting an operation performed on a previous or next key of the preset widget.

12. The terminal device of claim 10, wherein the instructions further cause the processor to be configured to:
   determine, in response to the terminal device displaying an unlock screen and a user enabling the preset widget, whether the preset widget has a multimedia file that has not been played completely;
   obtain a second poster corresponding to the multimedia file that has not been played completely in response to the preset widget having the multimedia file that has not been played completely; and
   set the second poster as the wallpaper of a screen of the terminal device.

13. The terminal device of claim 10, wherein the instructions further cause the processor to be configured to:
   determine, in response to the terminal device being powered on or displaying an unlock screen, a user preference based on historical playback data collected by a system of the preset widget;
   obtain a second poster based on the user preference; and
   set the second poster as the wallpaper of a screen of the terminal device.

14. The terminal device of claim 10, wherein the instructions further cause the processor to be configured to:
   obtain a second poster pushed to the terminal device;
   determine that a user enables the preset widget in response to the terminal device being powered on or displaying an unlock screen; and
   set the second poster as the wallpaper of the screen.

15. The terminal device of claim 10, wherein the instructions further cause the processor to be configured to:
   set at least two first posters as the wallpaper of the screen; and
   display portions of the at least two first posters as the wallpaper in a preset manner.

16. The terminal device of claim 15, wherein the instructions further cause the processor to be configured to perform one of:
   display each portion of the at least two first posters at a preset time interval;
   display the portions of the at least two first posters on the screen in a preset layout;
   display each portion of the at least two first posters in a preset sequence; or
   display the portions of the at least two first posters in a preset animation manner.

17. The terminal device of claim 10, wherein the current multimedia file is at least one of an audio file, a video file, an electronic book (ebook), or an image, and wherein the poster is at least one of a cover of a music album corresponding to the audio file, a publicity poster corresponding to the video file, a cover corresponding to the ebook, or a cover of an image collection corresponding to the image.

18. The terminal device of claim 10, wherein the instructions further cause the processor to be configured to obtain the poster corresponding to the current multimedia file in response to detecting an operation performed on the preset widget or in response to performing a function on an app corresponding to the preset widget.

19. A terminal device configured to implement a graphical user interface (GUI), comprising:
   a memory configured to store instructions; and
   a processor coupled to the memory and configured to execute the instructions, which cause the processor to be configured to:
      generate a GUI comprising a preset widget icon, wherein at least one shortcut function is preset for the preset widget icon; and
      generate a response and display a corresponding wallpaper after detecting that the terminal device displays an unlock screen, wherein the corresponding wallpaper comprises a poster corresponding to a current multimedia file of a preset widget corresponding to the preset widget icon that has not been played completely.

20. The terminal device of claim 19, wherein the current multimedia file is at least one of an audio file, a video file, an electronic book (ebook), or an image, and wherein the poster is at least one of a cover of a music album corresponding to the audio file, a publicity poster corresponding to the video file, a cover corresponding to the ebook, or a cover of an image collection corresponding to the image.

* * * * *